United States Patent
Sakamoto

[19]

[11] Patent Number: 5,966,313
[45] Date of Patent: Oct. 12, 1999

[54] APPARATUS AND METHOD FOR GENERATING RANDOM NUMBERS

[75] Inventor: Hideki Sakamoto, Tokyo, Japan

[73] Assignee: NEC Corporation, Tokyo, Japan

[21] Appl. No.: 08/890,985

[22] Filed: Jul. 10, 1997

[30] Foreign Application Priority Data

Jul. 11, 1996 [JP] Japan ................................. 8-182252

[51] Int. Cl.⁶ ............................... G06F 1/02; G06J 7/12; H03K 19/08
[52] U.S. Cl. .................... 364/717.01; 364/717; 364/602; 307/201
[58] Field of Search ........................... 307/201; 364/717, 364/602; 365/244; 380/46, 4, 30; 358/455; 331/78; 235/152; 340/172.5, 146.2

[56] References Cited

U.S. PATENT DOCUMENTS

| | | | |
|---|---|---|---|
| 3,166,733 | 1/1965 | Schuman | 340/146.2 |
| 3,701,107 | 10/1972 | Williams | 340/172.5 |
| 3,790,768 | 2/1974 | Chevalier et al. | 235/152 |
| 3,946,215 | 3/1976 | May | 235/152 |
| 4,161,041 | 7/1979 | Butler et al. | 365/244 |
| 4,183,088 | 1/1980 | Simmons | 364/717 |
| 4,366,393 | 12/1982 | Kasuya | 307/221 |
| 4,408,298 | 10/1983 | Ruhland | 364/717 |
| 4,810,975 | 3/1989 | Dias | 331/78 |
| 4,853,884 | 8/1989 | Brown et al. | 364/602 |
| 4,855,690 | 8/1989 | Dias | 331/78 |
| 4,905,176 | 2/1990 | Schulz | 364/717 |
| 5,007,087 | 4/1991 | Bernstein et al. | 380/46 |
| 5,065,256 | 11/1991 | Suganuma et al. | 358/455 |
| 5,117,380 | 5/1992 | Tanagawa | 364/717 |
| 5,201,000 | 4/1993 | Matyas et al. | 380/30 |
| 5,206,905 | 4/1993 | Lee et al. | 380/4 |
| 5,239,494 | 8/1993 | Golbeck | 364/602 |
| 5,251,165 | 10/1993 | James, III | 364/717 |
| 5,324,991 | 6/1994 | Furuta et al. | 307/201 |
| 5,383,143 | 1/1995 | Crouch et al. | 364/717 |
| 5,627,894 | 5/1997 | Albert et al. | 380/46 |
| 5,633,816 | 5/1997 | Wallace | 364/717 |

OTHER PUBLICATIONS

Paplinski et al., 'Hardware implementation of the Lehmer random number generator', IEE Proc. Comput. Digit. Tech., vol. 143, No. 1, pp. 93–95, Jan. 1996.

Steinberg et al., 'Finite–precision Intrinsic Randomness and Source Resolvability', IEEE Information Theory and Statistics, p. 30, 1994.

Anguita et al., 'Compact digital pseudorandom number generator', Electronics Letters, vol. 31, No. 12, pp. 956–958, Jun. 1995.

Wong, 'Random Number Generation Without Multiplication', IEEE Computers and Communications, pp. 217–221, 1990.

United States Advanced Television System Committee "Digital Audio Compression (AC–3) ATSC Standard" Doc. AC/52, Nov. 10, 1994, p. 67.

*Primary Examiner*—Hassan Kizou
*Assistant Examiner*—Nguyen X. Nguyen
*Attorney, Agent, or Firm*—Foley & Lardner

[57] ABSTRACT

If a random number generated by a random-number generator is equal to or greater than a random number having a predetermined amplitude, a high-level comparison result signal is produced to cause an AND gate and an OR gate to apply clock pulses to the random-number generator, which updates the random number. Only random numbers whose amplitude is smaller than the predetermined amplitude are stored in a D-type flip-flop and outputted as generated random numbers. Since random numbers whose amplitude is smaller than the predetermined amplitude are selected from the random numbers that are outputted from the random-number generator, a random-number generating apparatus does not require a processing circuit, and may be of a relatively small circuit scale and can generate random numbers having a desired amplitude at all times and with no amplitude errors.

18 Claims, 6 Drawing Sheets

APPARATUS AND METHOD FOR GENERATING RANDOM NUMBERS

BACKGROUND OF THE INVENTION

1. Field of the Invention

The present invention relates to an apparatus and a method for generating random numbers.

2. Description of the Related Art

Conventional random-number generators are arranged to generate random numbers ranging from "000 . . . 000" to "111 . . . 111". For example, an 8-bit random-number generator generates numerical values ranging from "00000000" to "11111111". If the position to the left of the most significant bit of these numerical values is the position of a decimal point, then the random-number generator generates numerical values from "0" to "0.999 . . . " according to the decimal notation, i.e., numerical values from not less than "0" to less than "1". These random numbers will hereinafter be referred to as "random numbers of the amplitude 1.

FIG. 8 of the accompanying drawings shows a polynomial counter which is widely used as a random-number circuit. For the sake of brevity, the illustrated polynomial counter is of a 4-bit configuration, i.e., comprises four cascaded D-type flip-flops. As shown in the timing chart of FIG. 9 of the accompanying drawings, a 4-bit random number of R3, R2, R1, R0 produced by the polynomial counter is successively updated in synchronization with a rise of a clock signal CK, so that the polynomial counter generates random numbers ranging from "0000" to "1110". The polynomial counter does not generate a random number "1111" because it is prohibited due to circuit limitations of the polynomial counter, but not because the polynomial counter is intentionally arranged not to generate the random number "1111". The polynomial counter generates all combinations of 0, 1, one at a time, except for "1111", and is then returned to a state immediately after it is reset. Generally, random-number generators are arranged to generate all combinations of 0, 1, i.e., to generate random numbers of the amplitude 1.

Actual random-number applications may not always necessarily require random numbers of the amplitude 1. In this connection, an example of dither in an audio signal processing application will be described below. Dithering is the application of small-amplitude noise to a small-amplitude signal so as to prevent the small-amplitude signal from being converted into noise by quantization. As shown in FIG. 10(a) of the accompanying drawings, when a weak signal that varies in an amplitude comparable to the amplitude of a least significant bit (LSB) is quantized, the quantized signal suffers changes greater than the changes in the original signal. To avoid this drawback, dither or an oscillation is applied to the original signal, and the resultant signal is quantized. Even when the original signal changes in an amplitude less than the amplitude of one bit, the quantized signal changes its sign, thereby improving the audible perception of the reproduced signal. As can be seen from the purpose of dithering, the dither signal has an amplitude which is smaller than the amplitude of one bit. White noise, i.e., random numbers, is used as dither so that noise added as dither will not be perceived as certain sound.

One specific example which employs dithering is a Dolby-AC-3 system, which is a highly efficient audio signal coding system, and the system processes an audio signal by dividing it into a mantissa and an exponent. When the number of bits allocated to the mantissa is 0 (zero), a random number is used as dither instead of 0. At that time, random numbers ranging from +0.707 to −0.707 are used as dither. For more detail, reference should be made to United States Advanced Television Systems Committee "Digital Audio Compression (AC-3) ATSC STANDARD" Doc. AC/52 Nov. 10, 1994, pp. 66. Therefore, random numbers having an amplitude of 0.707 (square root of ½) are needed. Since it is known that it has heretofore been difficult to generate random numbers having an amplitude of 0.707, the above document suggests that random numbers having a more easily achievable amplitude of 0.75 or 0.5 be used instead of random numbers having an amplitude of 0.707.

Conventional processes of generating ideal random numbers having an amplitude of 0.707 and substitute random numbers having amplitudes of 0.75 and 0.5 will be described below.

To generate a random number having an amplitude of 0.707, as shown in FIG. 1 of the accompanying drawings, a random number having an amplitude 1, which is generated by a first random-number generator 101, and a constant of 0.707 generated by a constant generator 102 are supplied to a multiplier 103, which multiplies the random number by the constant 0.707, thereby generating a random number having an amplitude of 0.707. This process can produce random numbers having an ideal amplitude, but requires the multiplier 103 and hence a large overall circuit scale.

To generate a random number having an amplitude of 0.75, as shown in FIG. 2 of the accompanying drawings, a random number having an amplitude 1, which is generated by a first random-number generator 201, is shifted one bit and two bits to the right by respective shifters 202, 203, and then added to each other by an adder 204, thereby generating a random number having an amplitude of 0.75. The generated amplitude of 0.75 has an error of about 6% with respect to the ideal amplitude of 0.707. This process also needs a relative large overall circuit scale because of the need for the adder 204, though the overall circuit scale is smaller than the overall circuit scale shown in FIG. 1.

To generate a random number having an amplitude of 0.5, as shown in FIG. 3 of the accompanying drawings, a random number having an amplitude 1, which is generated by a first random-number generator 301, is shifted one bit to the right by a shifter 302, thereby generating a random number having an amplitude of 0.5. The generated amplitude of 0.5 has an error of about 30% with respect to the ideal amplitude of 0.707. This process needs a relatively small overall circuit scale.

As described above, it has been customary to combine a random-number generator for generating a random number having an amplitude 1 and a circuit or circuits for varying the amplitude of a random number are combined with each other to produce a random number having an amplitude other than the amplitude 1. The overall scale of a required circuit arrangement and the size of an amplitude error are inversely proportional to each other, and cannot be improved at the same time.

With the conventional random-number generating apparatus, therefore, a random number having an amplitude 1 is generated at first and then processed into a random number having a desired amplitude. A relatively large-size processing circuit is required to achieve a desired amplitude with high accuracy. If a smaller-scale processing circuit were employed, then a produced amplitude would suffer a larger error. Conventional random-number generating apparatus has been unable to provide a random-number generating apparatus which is relatively small in circuit scale and capable of generating random numbers of a highly accurate amplitude.

SUMMARY OF THE INVENTION

It is therefore an object of the present invention to provide an apparatus for and a method of generating a random number having a desired error-free amplitude with a relatively small circuit scale.

According to the present invention, there is provided an apparatus operable in synchronization with clock pulses for generating random numbers of a predetermined length in response to a request signal, comprising a random-number generator for generating a random number of the predetermined length in response to an operation pulse, a comparator circuit for determining whether the generated random number is smaller than a predetermined number or not, and a logic circuit responsive to the request signal, the comparison result signal, and the clock pulses, for generating the operation pulse with the request signal and also generating the operation pulse with the clock pulses if the generated random number is not smaller than the predetermined number.

The random-number generator may comprise a polynomial counter comprising as many cascaded storage devices as the predetermined length, for feeding a logic combination of outputs of the cascaded storage devices back to a first one of the cascaded storage devices.

The logic circuit may comprise an AND circuit for outputting AND of inverted logic of comparison result signal and block pulses, and an OR circuit for outputting OR from AND circuit and request signal.

According to the present invention, there is also provided a method of generating random numbers, comprising the steps of generating a random number of a predetermined length, determining whether the generated random number is smaller than a predetermined number or not, and repeating the step of generating and the step of determining if the generated random number is not smaller than the predetermined number.

The above and other objects, features, and advantages of the present invention will become apparent from the following description with references to the accompanying drawings which illustrate an example of the present invention.

DETAILED DESCRIPTION OF THE PREFERRED EMBODIMENT

Figure 1:
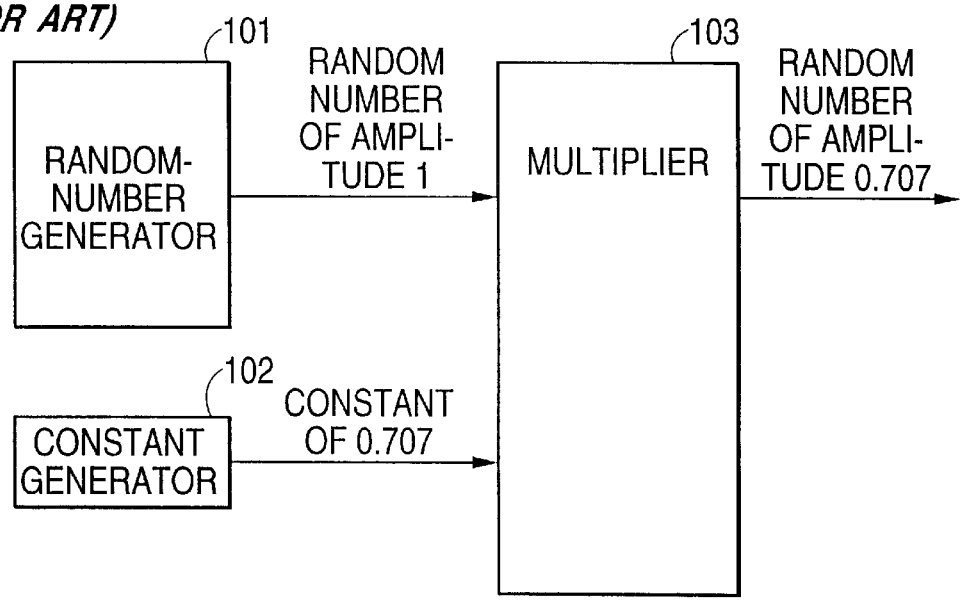
FIG. 1 is a block diagram of a conventional random-number generating apparatus.
Figure 2:
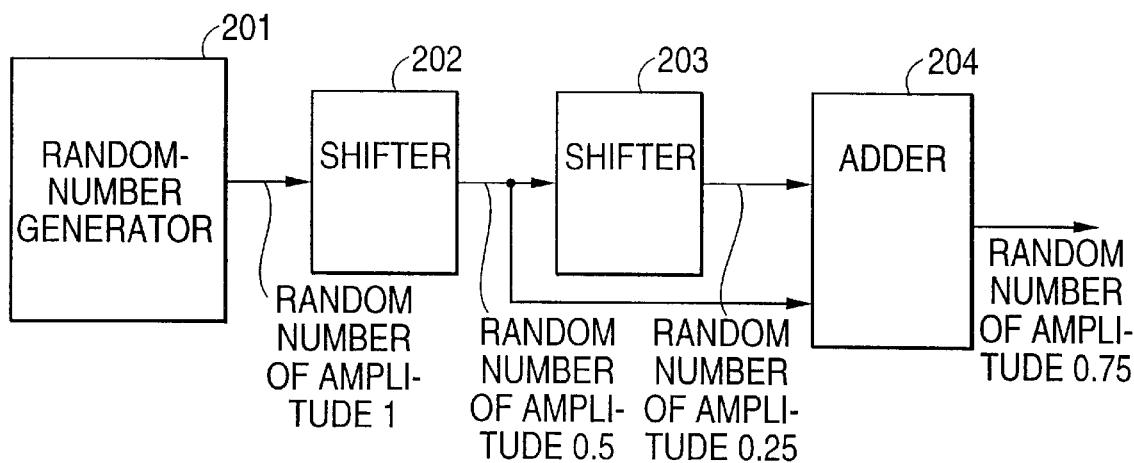
FIG. 2 is a block diagram of another conventional random-number generating apparatus.
Figure 3:
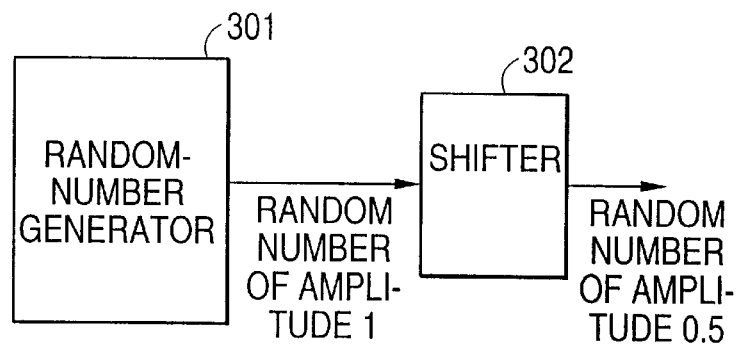
FIG. 3 is a block diagram of still another conventional random-number generating apparatus.
Figure 4:
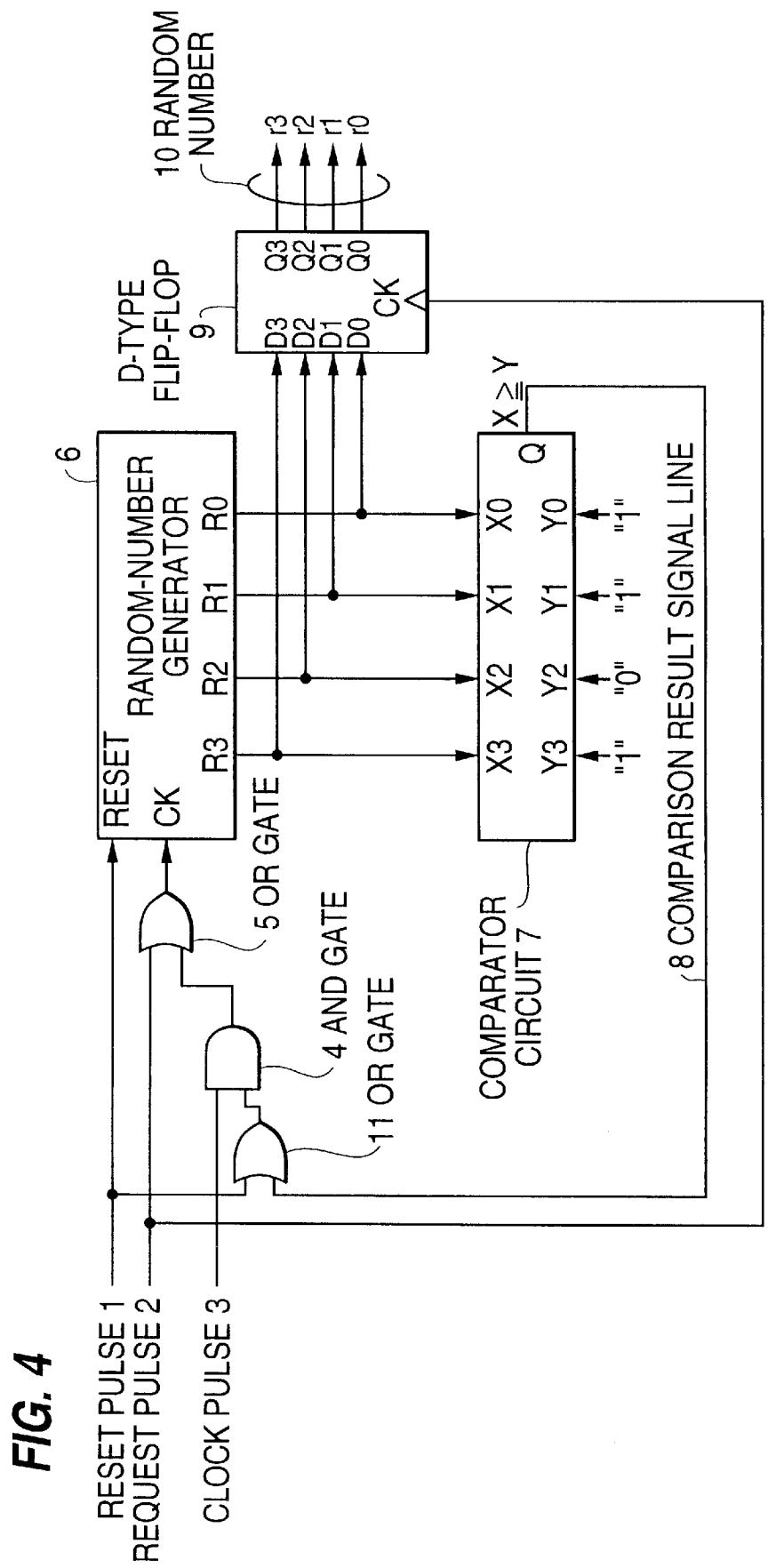
FIG. 4 is a block diagram of a random-number generating apparatus according to the present invention.

FIG. 4 shows in block form a random-number generating apparatus according to the present invention. As shown in FIG. 4, the random-number generating apparatus has a random-number generator 6 which can be initialized by a reset pulse 1 applied thereto. A request pulse, which requests the random-number generator 6 to generate a random number, is generated once each time 16 clock pulses 3 are generated. The clock pulses 3 serve as an operation clock signal for the random-number generating apparatus in its entirety.

Figure 8:
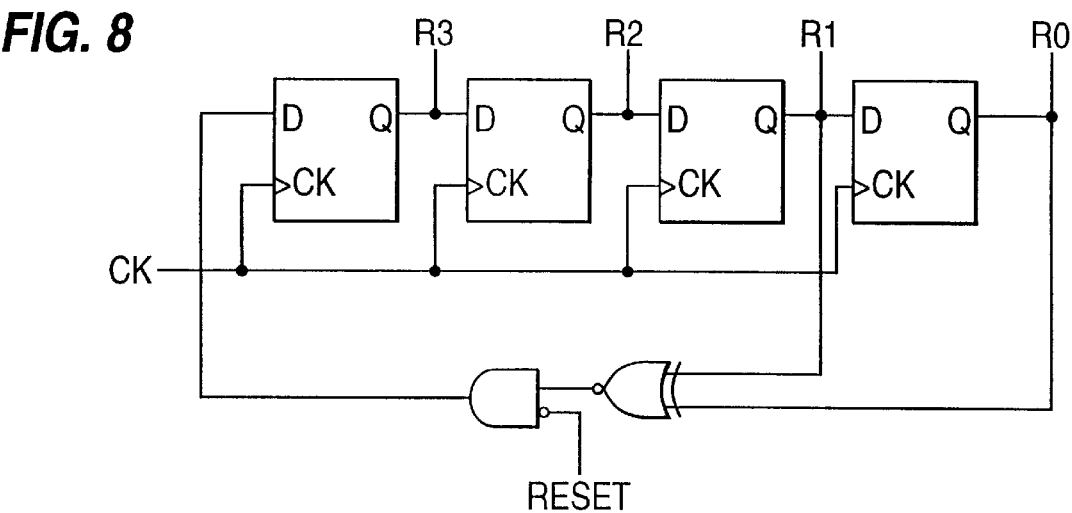
FIG. 8 is a block diagram of a polynomial counter.
Figure 9:
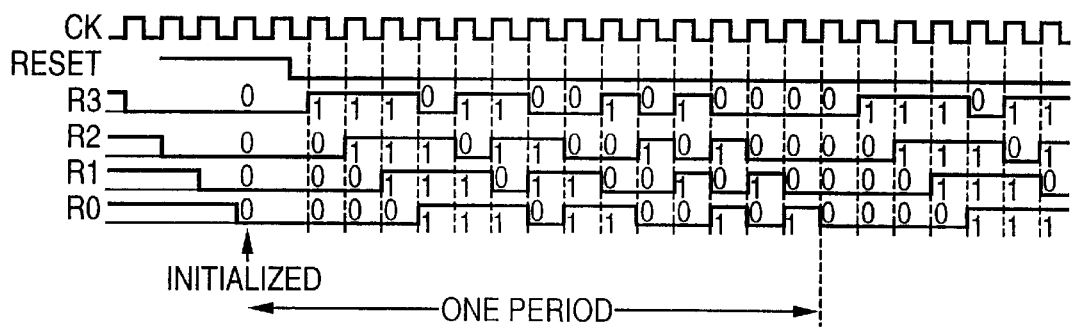
FIG. 9 is a timing chart of an operation sequence of the polynomial counter.
Figure 10A:
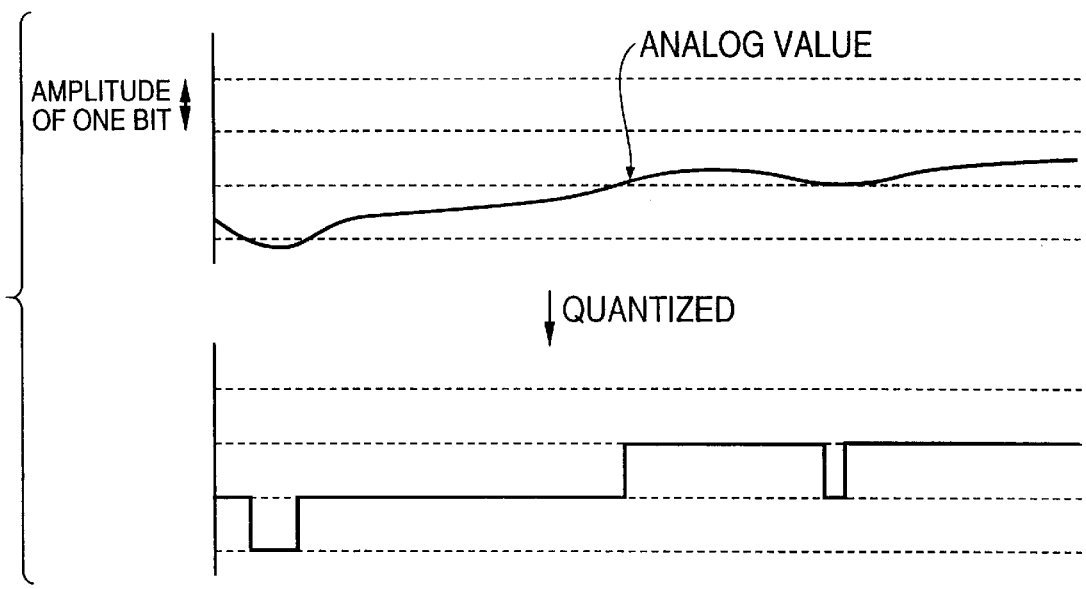
FIGS. 10(a) and 10(b) are diagrams illustrative of a dithering process.
Figure 10B:
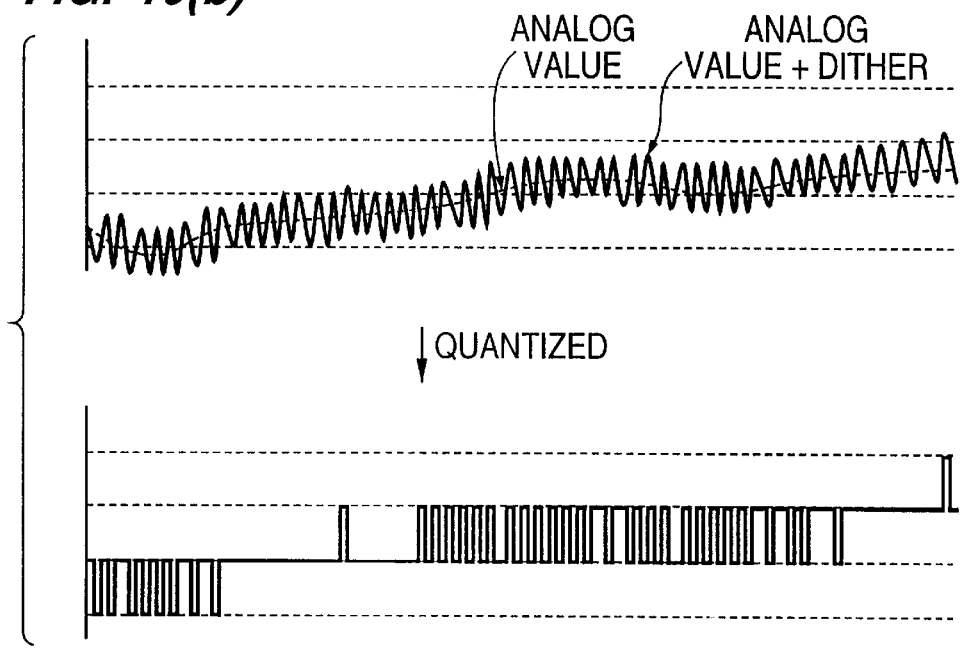

The random-number generating apparatus includes a 2-input AND gate 4 for being supplied with clock pulses 3, and a 2-input OR gate 5 for being supplied with a request pulse 2. The random-number generator 6 comprises a 4-bit polynomial counter which is identical to the conventional 4-bit polynomial counter shown in FIG. 8. The AND gate 4 has an output terminal connected to one of the input terminals of the OR gate 5, whose output terminal is connected to a clock input terminal of the random-number generator 6.

The random-number generating apparatus also has a 4-bit comparator circuit 7 for comparing a 4-bit input value X comprising X3, X2, X1, X0 supplied as an output R3, R2, R1, R0 from the random-number generator 6 with a 4-bit reference value Y comprising Y3, Y2, Y1, Y0, and outputting a high-level signal to a comparison result signal line 8 if X≧Y and a low-level signal to the comparison result signal line 8 if X<Y. The reference value Y represents a 4-bit constant "1011" expressed by a binary representation converted from 0.707. If the input value X is equal to or greater than 0.707, then the comparator circuit 7 outputs a high-level signal to the comparison result signal line 8. If the input value X is smaller than 0.707, then the comparator circuit 7 outputs a low-level signal to the comparison result signal line 8.

A 4-bit D-type flip-flop 9 reads the output R3, R2, R1, R0 from the random-number generator 6 in synchronization with the positive-going edge of a request pulse 2, and outputs a random number 10 comprising 4 bits of r3, r2, r1, r0.

The random-number generating apparatus also includes a 2-input OR gate 11 for being supplied with a reset pulse 1 and a signal from the comparison result signal line 8. The OR gate 11 has an output terminal connected to one of the input terminals of the AND gate 4.

Figure 5:
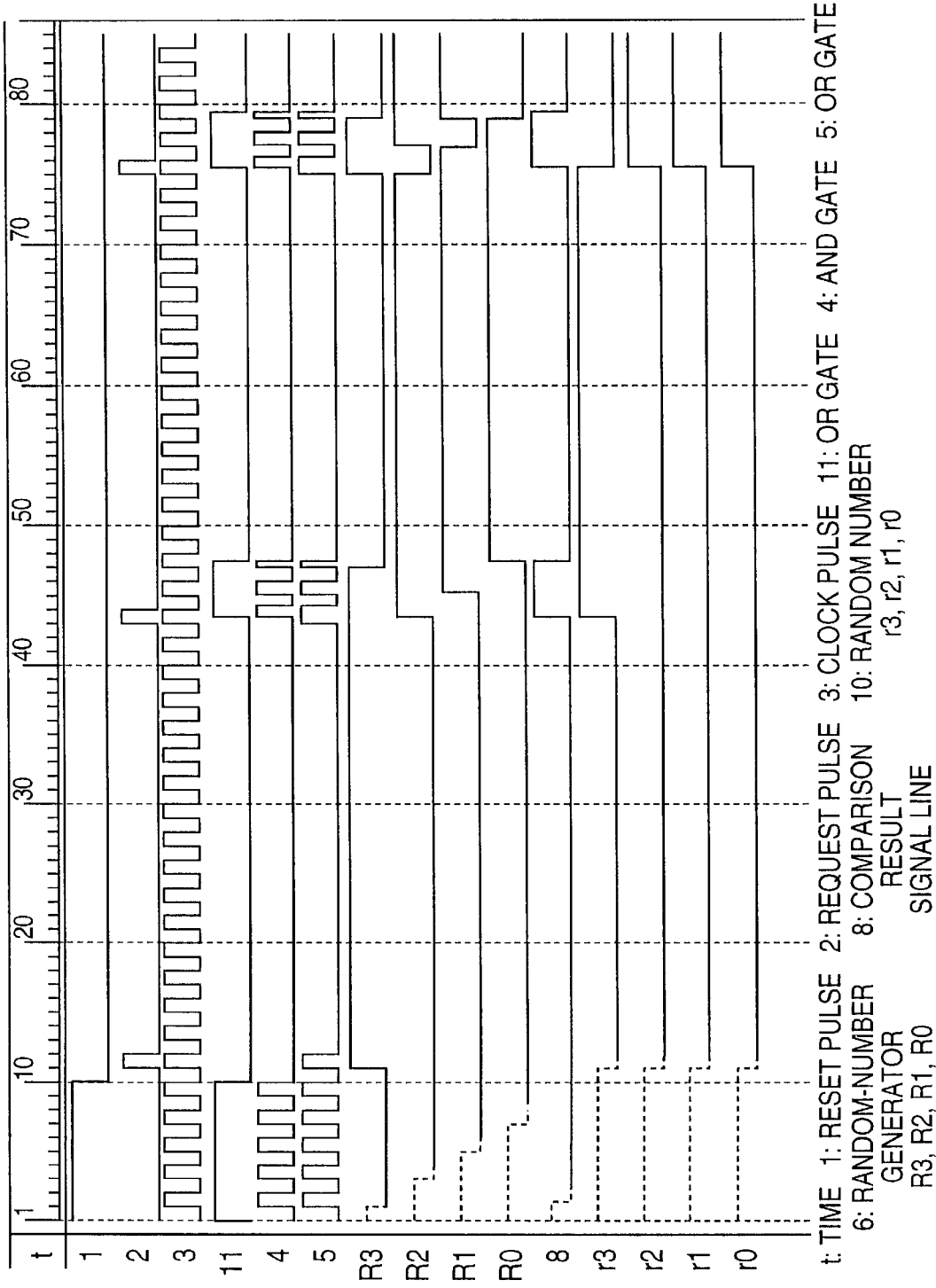
FIG. 5 is a timing chart of an operation sequence of the random-number generating apparatus according to the present invention.

Operation of the random-number generating apparatus will be described below with reference to a timing chart shown in FIG. 5.

From a time t=1 to a time t=10, the reset pulse 1 is of a level 1 and the OR gate 11 produces an output signal fixed to a level 1. Therefore, the AND gate 4 outputs clock pulses 3. During this time, no request pulse 2 is applied, causing the OR gate 5 to output clock pulses 3 to the random-number generator 6. The random-number generator 6 is initialized, producing an output (R3, R2, R1, R0)="0000" which is supplied to the comparator circuit 7. Since this numerical value "0000" is smaller than the reference value "1011", the comparator circuit 7 outputs a low-level (level 0) signal to the comparison result signal line 8.

At a time t=11, a request pulse 2 is applied, enabling the D-type flip-flop 9 to store the output R3, R2, R1, R0="0000" from the random-number generator 6, and output them as a random number 10. The request pulse 2 is also supplied through the OR gate 5 to the random-number generator 6, which updates the generated random number (R3, R2, R1, R0) to "1000". This numerical value "1000" is still smaller than the reference value "1011", and hence the comparator circuit 7 outputs a low-level (level 0) signal to the comparison result signal line 8.

When a next request pulse 2 is applied at a time t=43, the D-type flip-flop 9 stores the numerical value "1000" and outputs it as a random number 10. The request pulse 2 is also supplied through the OR gate 5 to the random-number generator 6, which updates the generated random number (R3, R2, R1, R0) to "1100". Because the numerical value "1100" is greater than the reference value "1011", the comparator circuit 7 outputs a false signal, i.e., a high-level (level 1) signal, to the comparison result signal line 8, whereupon the OR gate 11 outputs a signal having a level 1. Therefore, clock pulses 3 are supplied through the AND gate 4 and the OR gate 5 to the random-number generator 6. The random-number generator 6 updates again the generated random number (R3, R2, R1, R0) to "1110" at a time t=45.

The numerical value "1110" is greater than the reference value "1011", and the comparator circuit 7 outputs a false signal, i.e., a high-level (level 1) signal, to the comparison result signal line 8. Since clock pulses 3 are supplied through the AND gate 4 and the OR gate 5 to the random-number generator 6, the random-number generator 6 updates again the generated random number (R3, R2, R1, R0) to "0111" at a time t=48. Now, since the numerical value "0111" is smaller than the reference value "1011", the comparator circuit 7 outputs a low-level (level 0) signal to the comparison result signal line 8. The AND gate 4 is closed, failing to supply clock pulses 3 to the random-number generator 6, which holds the generated random number (R3, R2, R1, R0)="0111".

When a next request pulse 2 is applied at a time t=75, the D-type flip-flop 9 stores "0111" and outputs it as a random number 10. The request pulse 2 is also supplied through the OR gate 5 to the random-number generator 6, which updates the generated random number (R3, R2, R1, R0) to "1011". Because the numerical value "1011" is equal to the reference value "1011", the comparator circuit 7 outputs a false signal, i.e., a high-level (level 1) signal, to the comparison result signal line 8. Clock pulses 3 are supplied to the random-number generator 6, which updates again the generated random number (R3, R2, R1, R0) to "1101" at a time t=77. As the numerical value "1101" is greater than the reference value "1011", the random-number generator 6 updates again the generated random number (R3, R2, R1, R0) to "0110" at a time t=79. Inasmuch as the numerical value "0110" is smaller than the reference value "1011", the random-number generator 6 holds the generated random number (R3, R2, R1, R0)="0110".

As described above, insofar as the random number (R3, R2, R1, R0) generated by the random-number generator 6 is equal to or greater than "1011", the comparator circuit 7 outputs a false signal, allowing clock pulses 3 to be applied to the random-number generator 6. The random-number generator 6 updates the random number. Otherwise, the random-number generator 6 holds the random number. When a next request pulse 2 is applied, the D-type flip-flop 9 stores the held numerical value and outputs it as a random number 10. As a consequence, the random number 10 is necessarily smaller than "1011" and hence has an amplitude of 0.707.

Figure 6:
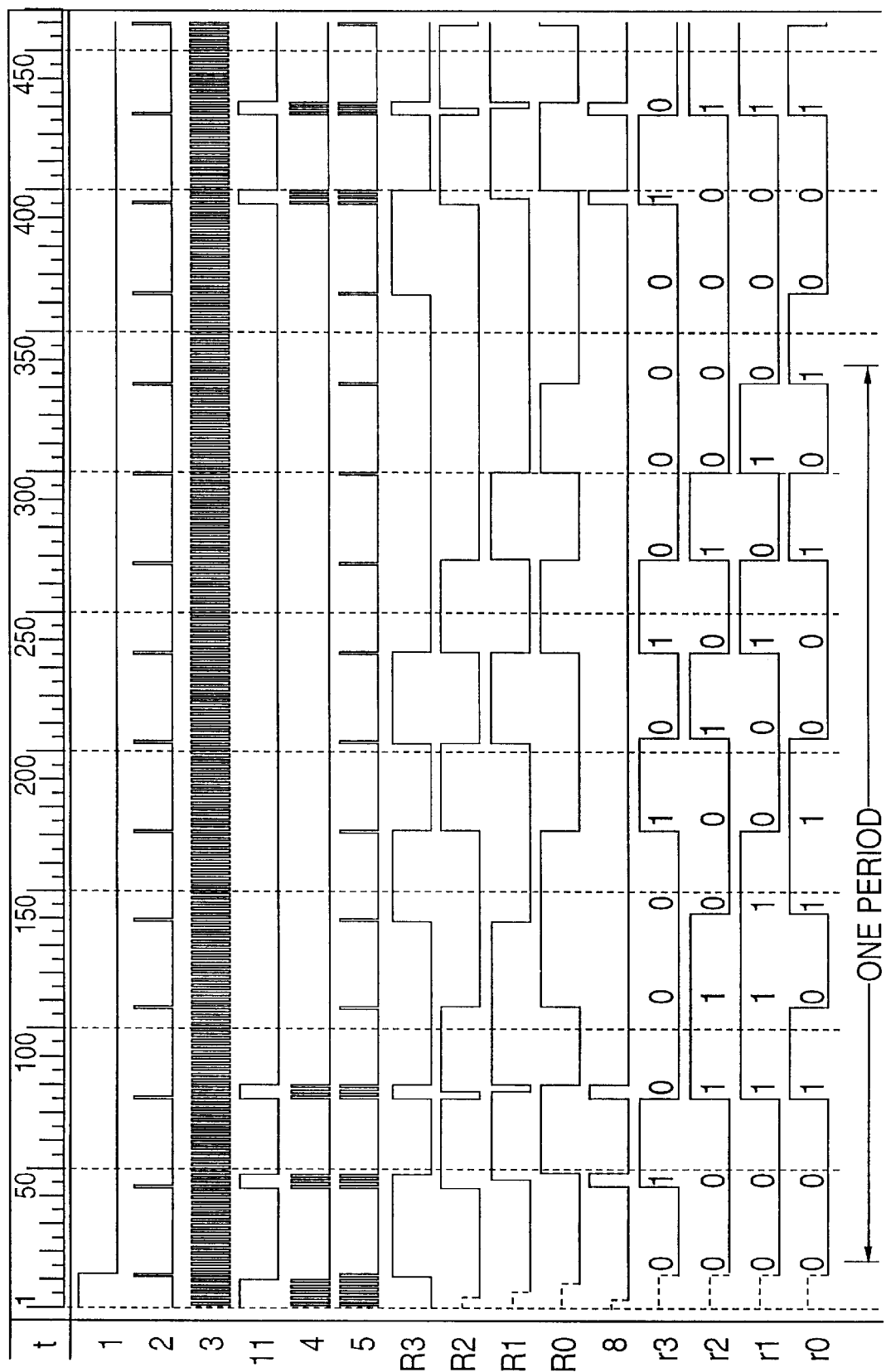
FIG. 6 is a timing chart of an operation sequence of the random-number generating apparatus according to the present invention.

FIG. 6 shows a timing chart up to a time t=460. It can be seen from FIG. 6 that the random number 10 which is generated is smaller than "1011", i.e., has an amplitude of 0.707.

As described above, it is possible according to the present invention to generate random numbers having an amplitude of 0.707 by adding a small amount of logic circuitry to the random-number generator 6. According to the present invention, it is not necessary to add large-scale processing circuits or tolerate large amplitude errors.

Figure 7:
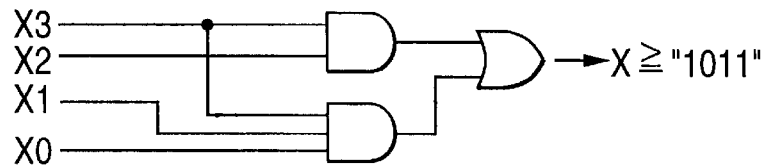
FIG. 7 is a block diagram of a comparator of the random-number generating apparatus according to the present invention.

The comparator circuit 7 shown in FIG. 4 may be of a general comparator circuit arrangement. However, it may comprise a circuit for determining whether an input signal is larger or smaller than "1011" as shown in FIG. 7. The circuit shown in FIG. 7 indicates that the comparator circuit 7 may be very simple.

While the random-number generating apparatus for generating random numbers having an amplitude of 0.707 has been described in the above embodiment, it is apparent that it can generate random numbers having other amplitudes by changing the reference value "1011" in the comparator circuit 7. Furthermore, the random-number generating apparatus may be arranged to generate random numbers composed of more or less bits than four bits.

As described above, the random-number generating apparatus according to the present invention selects random numbers whose amplitude is smaller than a certain amplitude, from the random numbers that are outputted from the random-number generator. Accordingly, the random-number generating apparatus generates random numbers having a desired amplitude at all times and suffering no amplitude errors. Since the random-number generating apparatus does not effect processing to change amplitudes, it requires no processing circuit and hence is of a relatively small circuit scale. As a consequence, the random-number generating apparatus is of a relatively small circuit scale and capable of generating random numbers having a desired amplitude without amplitude errors.

It is to be understood that variations and modifications of the cross-connection devices disclosed herein will be evident to those skilled in the art. It is intended that all such modifications and variations be included within the scope of the appended claims.

What is claimed is:

1. An apparatus operable in synchronization with clock pulses for generating random numbers of a predetermined length that are less than a predetermined number in response to a request signal, comprising:

a random-number generating circuit for generating a random number of the predetermined length in response to an operation pulse;

a comparator circuit for determining whether or not the generated random number is smaller than the predetermined number and outputting a comparison result signal; and a logic circuit responsive to said request signal, said comparison result signal, and said clock pulses, for generating said operation pulse in response to said request signal and in response to said clock pulses if said generated random number is not smaller than said predetermined number.

2. An apparatus according to claim 1, wherein said random-number generating circuit comprises a polynomial counter comprising as many cascaded storage elements as bits in said random numbers of the predetermined length, for feeding a logic combination of outputs of said cascaded storage elements back to a first one of said cascaded storage elements.

3. An apparatus according to claim 2, wherein said logic circuit comprises:

an AND gate for outputting a logical AND result of an inverted logic level of said comparison result signal and said clock pulses; and an OR gate for outputting a logical OR result of an output from said AND gate and said request signal.

4. An apparatus according to claim 1, wherein said logic circuit comprises:

an AND gate for outputting a logical AND result of an inverted logic level of said comparison result signal and said clock pulses; and an OR gate for outputting a logical OR result of an output from said AND gate and said request signal.

5. An apparatus according to claim 1, further comprising a flip-flop connected to the random-number generating circuit and responsive to the request signal to store and output the random number generated by the random-number generating circuit.

6. An apparatus according to claim 5, wherein the random-number generating circuit is further responsive to a reset signal for initializing the random-number generating circuit.

7. An apparatus according to claim 6, wherein the logic circuit includes:

a first OR gate for outputting a logical OR result of an inverted logic level of the comparison result signal and the reset signal;

an AND gate for outputting a logical AND result of an output signal of the first OR gate and the clock pulses; and a second OR gate for outputting a logical OR result of an output signal of the AND gate and the request signal, wherein the operation pulse comprises an output signal of the second OR gate.

8. An apparatus for generating random numbers, comprising:

random-number generating means for generating a random number of a predetermined length in response to an operation pulse; and means for determining whether or not the generated random number is smaller than a predetermined number and supplying said operation pulse to said random-number generating means depending on whether or not the generated random number is smaller than the predetermined number.

9. An apparatus according to claim 8, wherein said means for determining and supplying includes a comparator circuit, said comparator circuit comparing the generated random number with the predetermined number and outputting a low signal when the generated random number is smaller than the predetermined number and a high signal when the generated random number is equal to or greater than the predetermined number.

10. An apparatus according to claim 9, wherein said means for determining and supplying includes a logical circuit, said logical circuit receiving the low and high signals from the comparison circuit and outputting the operation pulse synchronously with clock pulses when a high signal is received from the comparison circuit.

11. An apparatus according to claim 10, wherein the random-number generating means is further responsive to a reset signal to produce an initial random number.

12. An apparatus according to claim 11, further comprising a flip-flop connected to the random-number generating means and responsive to a request signal to store and output the random number generated by the random-number generating circuit.

13. An apparatus according to claim 12, wherein the logical circuit includes:

a first OR gate for outputting a logical OR result of the low and high signals from the comparator circuit and the reset signal;

an AND gate for outputting a logical AND result of an output signal of the first OR gate and the clock pulses; and a second OR gate for outputting a logical OR result of an output signal of the AND gate and the request signal, wherein the operation pulse comprises an output signal of the second OR gate.

14. A method of generating random numbers, comprising the steps of:

generating a random number of a predetermined length;

determining whether or not the generated random number is smaller than a predetermined number; and repeating said step of generating and said step of determining if said generated random number is not smaller than said predetermined number.

15. A method according to claim 14, further comprising the step of generating an operation pulse if said generated random number is not smaller than said predetermined number, wherein the step of generating the random number is initiated in response to the operation pulse.

16. A method according to claim 15, wherein the step of generating the random number includes the step of generating an initial random number in response to a reset signal.

17. A method according to claim 16, further comprising the step of generating the operation pulse in response to a request signal.

18. A method according to claim 17, further comprising the step of outputting the generated random number in response to the request signal.

* * * * *